United States Patent [19]
Garnett

[11] Patent Number: 5,465,875
[45] Date of Patent: Nov. 14, 1995

[54] CLOSED TRANSFER DEVICES FOR AGRICULTURAL CHEMICALS AND THE LIKE

[75] Inventor: Richard H. Garnett, Hereford, Great Britain

[73] Assignee: Wisdom Agricultural Investment Limited, Hereford, Great Britain

[21] Appl. No.: 282,456

[22] Filed: Jul. 29, 1994

Related U.S. Application Data

[63] Continuation of Ser. No. 50,081, Apr. 27, 1993, abandoned.

[30] Foreign Application Priority Data

Nov. 20, 1990 [GB] United Kingdom ................ 9025265

[51] Int. Cl.⁶ ................................................ B67D 1/08
[52] U.S. Cl. .................. 222/148; 222/481.5; 222/482; 137/240; 137/588; 134/166 R
[58] Field of Search ........................ 222/82, 481.5, 222/482, 400.7, 148; 239/309, 379, 548; 137/588, 240; 134/166 R, 167 R

[56] References Cited

U.S. PATENT DOCUMENTS

| | | | |
|---|---|---|---|
| 2,161,049 | 6/1939 | Horstman | 222/82 |
| 2,628,850 | 2/1953 | Summerville | 284/4 |
| 3,127,073 | 3/1964 | Carleton | 222/400.7 |
| 3,211,178 | 10/1965 | Kiszko | 137/614.04 |
| 3,211,330 | 10/1965 | Frankel | 222/481.5 X |
| 3,374,927 | 3/1968 | Schmidt | 222/400.7 X |
| 3,856,570 | 12/1974 | McDermott | 134/167 R X |
| 4,023,718 | 5/1977 | Forbriger et al. | 222/400.1 X |
| 4,162,745 | 7/1979 | Anderson, Jr. | 137/240 X |
| 4,244,523 | 1/1981 | Looper | 134/167 R X |
| 4,269,333 | 5/1981 | Nakai et al. | 137/588 X |
| 4,328,909 | 5/1982 | Jeans | 222/481.5 X |
| 4,386,637 | 6/1983 | Buchanan et al. | 222/148 X |
| 4,706,847 | 11/1987 | Sankey et al. | 222/400.7 X |
| 4,905,871 | 3/1990 | Dutertre | 222/148 X |

FOREIGN PATENT DOCUMENTS

| | | |
|---|---|---|
| 0389191 | 9/1990 | European Pat. Off. |
| WO89/11219 | 11/1989 | WIPO |

*Primary Examiner*—Andres Kashnikow
*Assistant Examiner*—Lisa Douglas
*Attorney, Agent, or Firm*—Young & Thompson

[57] ABSTRACT

A supply cap 1 is provided for attachment to the outlet 2 of a container 3 to permit supply of a quantity of substance from within the container 3 to a supply conduit 15 in a sealed manner when the container 3 is inverted so that the outlet 2 is at its bottom. The cap 1 has a connector body 8 which is sealingly engageable with the outlet 2, an outlet duct 13 extending through the connector body 8 for supply of a quantity of substance from within the container 3 when the container is inverted, and an inlet duct 14 extending through the connector body 8 for the passage of air and/or rinsing liquid into the container 3. A dry break coupling part 17 is mounted on the connector body 8 for sealingly coupling the outlet duct 13 to the supply conduit 15 such that, when the supply conduit 15 is connected to the coupling part 17, supply of a quantity of substance from the outlet duct 13 to the supply conduit 15 is permitted whereas, when the supply conduit 15 is disconnected from the coupling part 17, the outlet duct 13 is closed off. Use of such a supply cap for dispensing of chemical concentrate serves to obviate the hazard to the operator due to possible concentrate spillage.

4 Claims, 3 Drawing Sheets

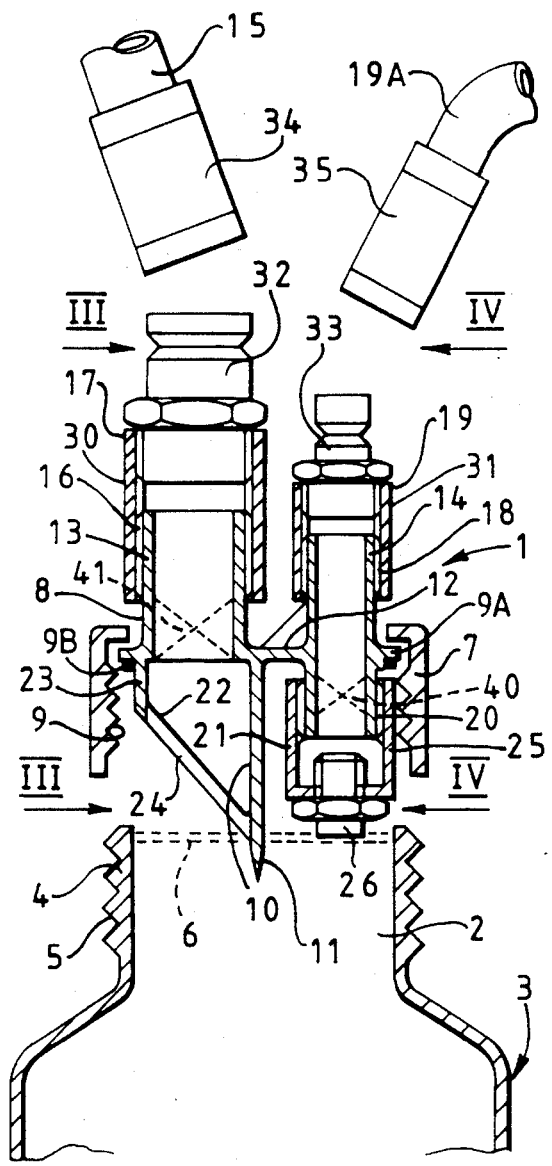
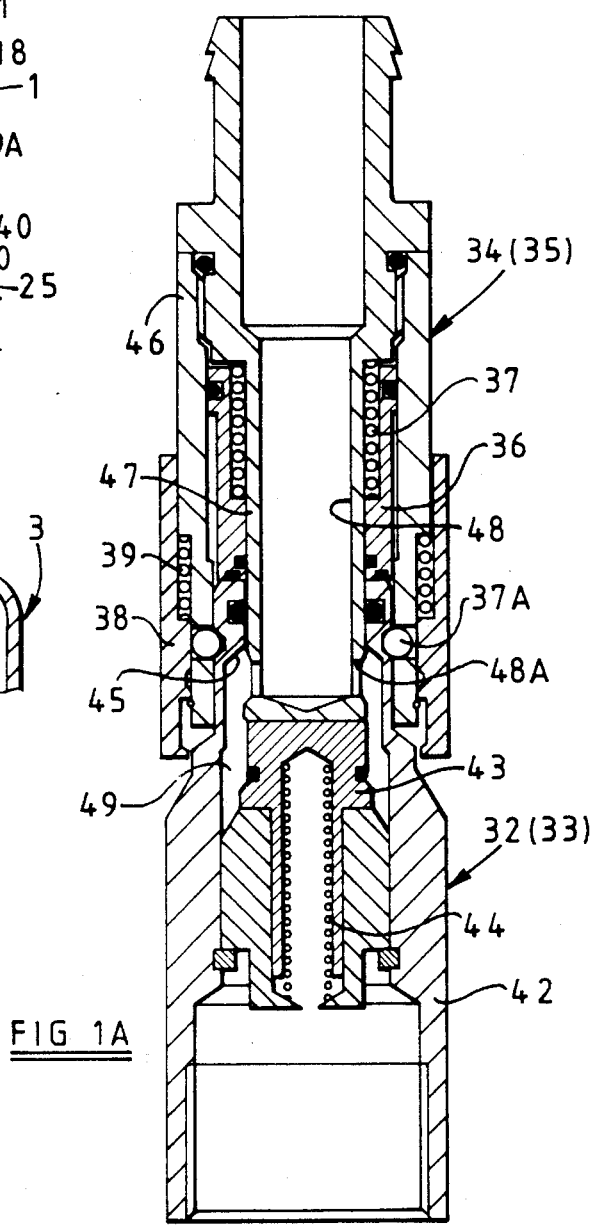
FIG 1
FIG 1A

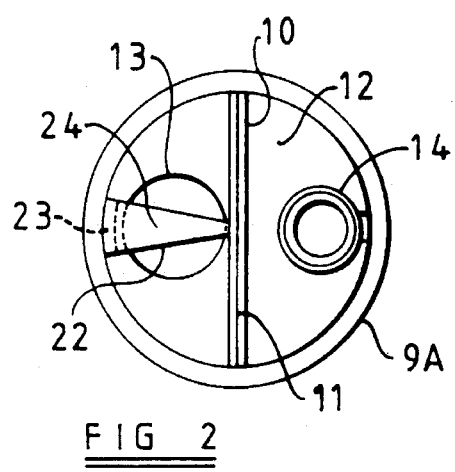
FIG 2
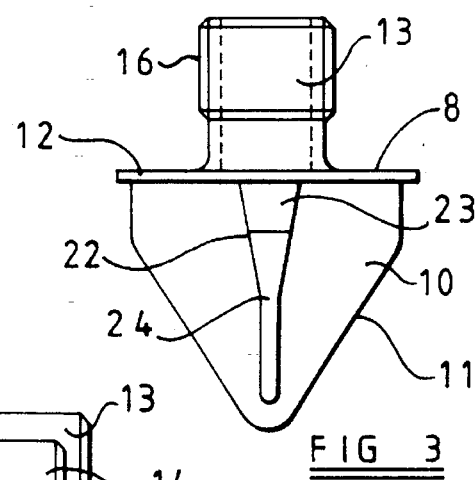
FIG 3
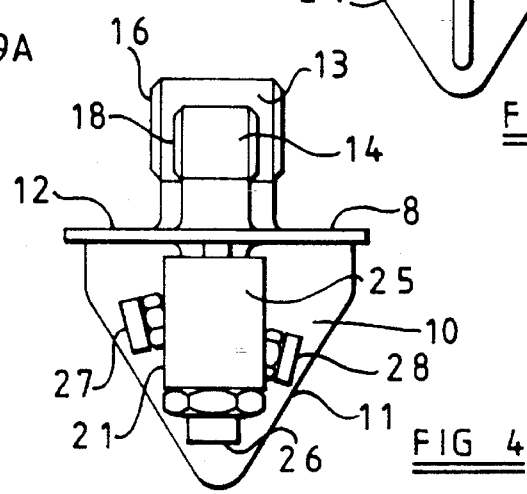
FIG 4
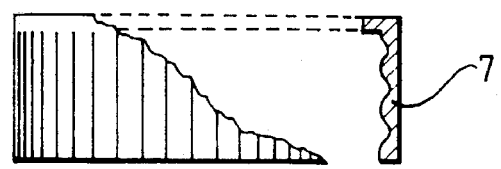
FIG 5
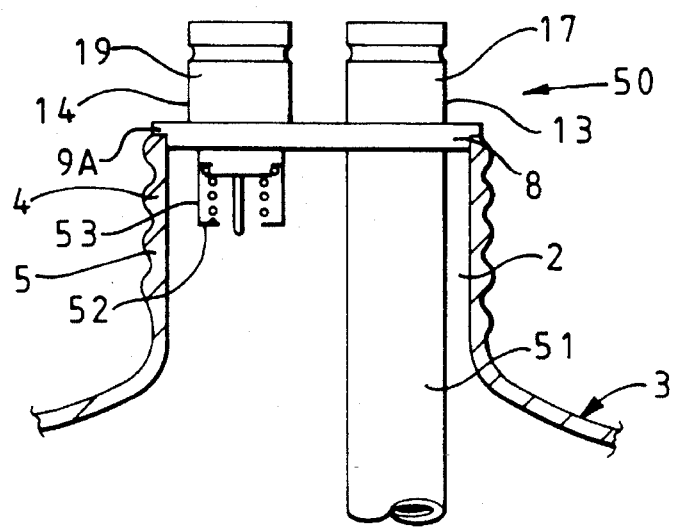

5,465,875

CLOSED TRANSFER DEVICES FOR AGRICULTURAL CHEMICALS AND THE LIKE

This application is a continuation of application Ser. No. 08/050,081, filed Apr. 27, 1993, now abandoned.

FIELD OF THE INVENTION

This invention relates to supply caps for attachment to container outlets to permit supply of a substance from within the container to a supply conduit in a sealed manner when the container is inverted so that its outlet is at its bottom.

BACKGROUND OF THE INVENTION

There are many applications in which it is required to transfer a substance from a container, in which the substance is supplied, to a supply point of a system in which the substance is to be processed or used, without permitting spillage or contamination of the substance. This may either be because the substances themselves or associated fumes are hazardous to operating personnel, or because the substances, such as foodstuffs, are to be kept free from contamination from the outside.

International Patent Publication No. WO 89/11219 discloses an agricultural sprayer system of a type which includes a reservoir for supplying a dilutant for mixing with a chemical concentrate, and a spray head for spraying a mixture of the dilutant and the concentrate. The concentrate is supplied in a container and requires to be diluted with the dilutant, generally water, prior to use, the container being subsequently rinsed out with dilutant. In order to obviate the hazard to the operator due to possible chemical concentrate spillage on transfer from the container to the sprayer system, the system includes a supply cap and associated hose for attachment to the outlet of the container to permit supply of concentrate to the system is a sealed manner when the container is inverted so that the outlet is at its bottom.

The known supply cap includes an outlet duct for supply of concentrate from within the container when the container is inverted, a valved inlet duct for the passage of air into the container during supply of concentrate through the outlet duct, and an associated float provided to ensure that, when the container is filled with rinsing solution, the valved inlet duct is closed off by the float when the level of solution reaches the height of the float in the container. However such a supply cap is complicated in construction and does not completely obviate the hazard to the operator due to possible concentrate spillage when the cap is being fitted to the container after removal of the closure with which the container is supplied.

It is an object of the invention to provide an improved supply cap for this purpose.

SUMMARY OF THE INVENTION

According to the present invention there is provided a supply cap for attachment to the outlet of a container containing a quantity of fluid to permit supply fluid under the action of gravity from within the container to a supply conduit in a sealed manner when the container is inverted so that the outlet is at its bottom, the cap including a connector body which is sealingly engageable with the outlet, an outlet duct extending through the connector body and adapted to be placed in fluid communication with the fluid within the container for supply of fluid from within the container by way of the outlet duct when the container is inverted, an inlet duct extending through the connector body and adapted to be placed in fluid communication with the fluid within the container for the passage of air and/or rinsing liquid into the container to displace fluid supplied by way of the outlet duct, and coupling means mounted on the connector body for sealingly coupling the outlet duct to the supply conduit such that, when the supply conduit is connected to the coupling means, supply of fluid from the outlet duct to the supply conduit under the action of gravity is permitted whereas, when the supply conduit is disconnected from the coupling means, the outlet duct is closed off.

In a preferred embodiment of the invention the connector body is provided with closure opening means for providing access through a closure member closing off the outlet when the connector body is engaged with the outlet so as to permit fluid communication of the outlet duct with the fluid within the container. In use of such an arrangement there is no need to remove a closure member, such as a membrane seal, with which the container may be supplied, prior to fitting of the supply cap to the outlet. The closure opening means may be constituted by perforating means, such as a cutting edge, or alternatively it may simply comprise a displacing rod for opening a valve constituting the closure member.

BRIEF DESCRIPTION OF THE DRAWINGS

In order that the invention may be more fully understood, several forms of supply cap in accordance with the invention will now be described, by way of example, with reference to the accompanying drawings, in which:

FIG. 1 is a section through a first supply cap for fitting to a container outlet;

FIG. 1A is a section through a dry break coupler of the first supply cap;

FIG. 2 is a view of the underneath of the first supply cap with a fitting ring and a nozzle part removed;

FIGS. 3 and 4 are side views of the first supply cap, with the fitting ring removed, taken respectively in the directions of the arrows III and IV in FIG. 1; and FIGS. 5 and 6 are sections through second and third supply caps fitted to container outlets.

DETAILED DESCRIPTION OF THE INVENTION

Figure 6:
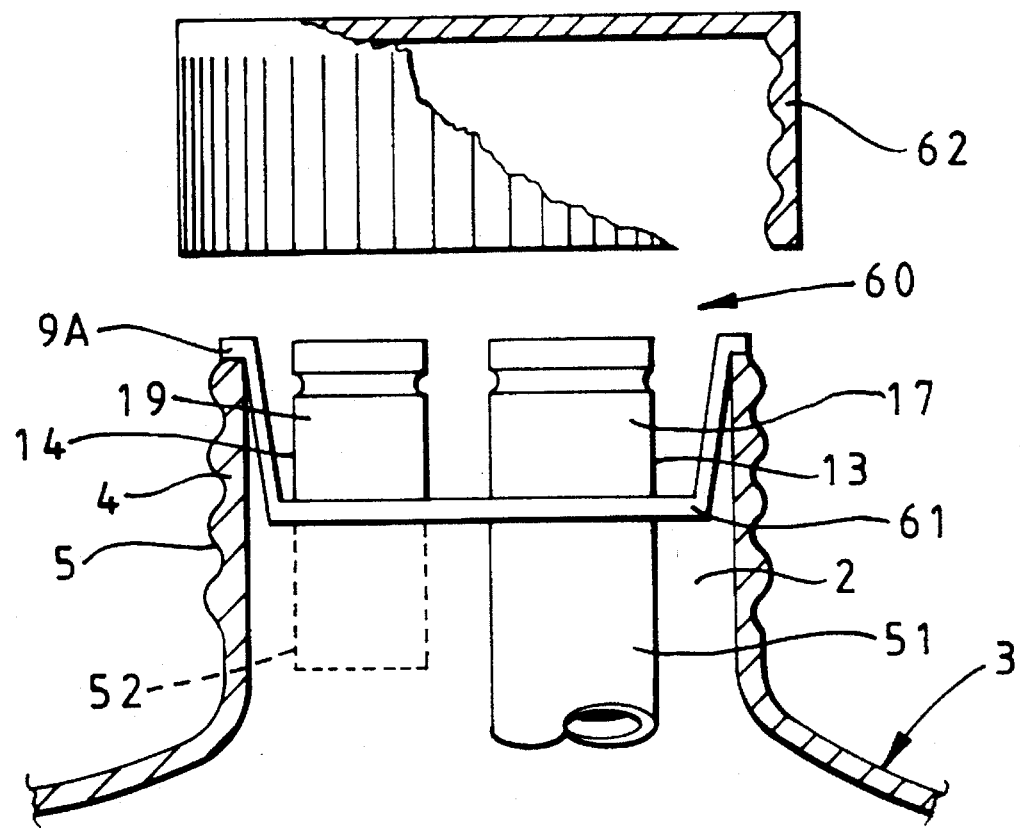

Referring to FIG. 1, the supply cap 1 is adapted for fitting to the screw-threaded outlet 2 of a standard plastics container 3 for containing a chemical concentrate which, when diluted, is used for agricultural spraying. The outlet 2 has an upstanding rim 4 having an external screw-thread 5 for receiving an internally screw-threaded cap (not shown) for closing off the outlet 2 when the container 3 is supplied to the user. As an additional seal to prevent leakage of the chemical concentrate from the container 3 during storage, a foil membrane 6, shown in broken lines in FIG. 1, is secured to the rim 4 about its periphery so as to seal the outlet 2.

The supply cap 1 is fitted to the outlet 2, after removal of the internally screw-threaded cap, by engaging an internally screw-threaded ring 7 of the supply cap 1 with the rim 4 and by rotating the ring 7 relative to the body 8 of the supply cap 1, so as to engage the internal screw-thread 9 of the ring 7 with the external screw-thread 5 of the rim 4 and so as to trap a sealing ring 9B between a shoulder 9A on the cap body 8 and the top of the rim 4. During fitting of the supply cap 1 to the outlet 2 a perforating cutting flange 10 having a curved knife edge 11 (as best seen in FIGS. 3 and 4) integral with the body 8 perforates the foil membrane 6 so as to provide access to the inside of the container 3.

The cap body 8 comprises a circular member 12 defining the shoulder 9A at its periphery and having an outlet duct 13 and an inlet duct 14 extending therethrough and integral therewith. The outlet duct 13 is provided for supply of chemical concentrate from within the container 3 to a supply conduit constituted by a flexible hose 15 when the container 3 is inverted. The outlet duct 13 has an external screw-thread 16 externally of the cap for attachment of a dry break coupling part 17 and does not extend internally of the cap beyond the circular member 12. The inlet duct 14 is provided to admit air to the container along an inlet conduit constituted by a flexible hose 19A to displace chemical concentrate discharged through the outlet duct 13 when the container is inverted, and also to admit rinsing liquid to the container after the container has been emptied with a view to flushing out any chemical concentrate still remaining in the container. The inlet duct 14 has an external screw-thread 18 externally of the cap for connection of a dry break coupling part 19. Furthermore the inlet duct 14 extends beyond the circular member 12 internally of the cap and is provided with an external screw-thread 20 internally of the cap for detachable connection of a nozzle part 21.

Extending between the circular member 12 and the cutting flange 10 is a strut 22 comprising a portion 23, as best seen in FIG. 3, extending perpendicularly to the circular member 12 and an inclined portion 24 which extends across the internal opening of the outlet duct 13, as best seen in FIG. 2, but which does not obstruct the opening. As well as providing lateral support to the cutting flange 10, the strut 22 acts to fold the foil membrane 6 out of the way on perforation of this membrane by the cutting flange 10 so that the membrane does not obstruct the outlet duct 13.

The nozzle part 21 comprises an internally screw-threaded sleeve 25 for fitting to the external screw-thread 20 of the inlet duct 14, and three replaceable nozzles 26, 27 and 28 (see FIG. 4) which extend through screw-threaded apertures in the walls of the sleeve 25. The nozzle 26 extends through the end wall of the sleeve 25 and is adapted to spray rinsing liquid over a conical angle of 90°, whereas the nozzles 27 and 28 extend through the side wall of the sleeve 25 and are inclined at slight angles downwardly and adapted to spray rinsing liquid over a conical angle of 50°. The nozzles are adapted to be unscrewed by a special tool and to be replaced by nozzles having different spray angles, aperture sizes, etc., as may be required for different applications or for metering different cleaning fluids. If required, the complete nozzle part 21 may be removed from the inlet duct 14 and replaced by an alternative nozzle part having different nozzles and/or nozzle arrangements.

It will be appreciated that the ring 7 and the dry break coupling parts 17 and 19 are omitted in FIGS. 2, 3 and 4, and that the nozzle part 21 is additionally omitted in FIG. 2.

Referring to FIG. 1, each of the dry break coupling parts 17 and 19 comprises a respective internally screw-threaded sleeve 30 or 31 for fitting to the outlet duct 13 or inlet duct 14 and a respective snap connector part 32 or 33 for detachable connection to a complementary dry break coupling part 34 or 35 provided on the hose 15 or 19A. Each of the dry break couplers formed by the coupling parts 32 and 34 and the coupling parts 33 and 35 is of a known type as will be described briefly with reference to FIG. 1A. The male coupling part 32 (or 33) has a body part 42 and a movable valve member 43 which is biased by a spring 44 so that, when disconnected from the female coupling part 34 (or 35), the valve member 43 is biased into engagement with the valve seat 45 formed on the inside of the body part 42 so as to prevent any leakage from the coupling part 32. The female coupling part 34 (or 35) has a body part 46 having an inner tubular part 47 which, when the connection is established with the male coupling part 32 (or 33), serves to displace the valve member 43 of the male coupling part inwardly against spring force so that fluid communication is established between the bore 48 of the tubular part 47 and an annular chamber 49 within the body part 42 by way of apertures 48A, the chamber 49 being in communication with the lower part of the coupler by means of axially extending bores (not shown) extending through the body part 42. The female coupling part also has an inner sealing sleeve 36 biased by a spring 37 such that, when the coupling parts are disconnected, the sleeve 36 closes off the apertures 48A in the tubular part 47 to prevent leakage from the female coupling part. In addition the female coupling part is locked to the male coupling part by a locking ring 37A which is releasable from an annular groove in the body part 42 by movement of an outer sleeve 38 upwardly against the action of a spring 39. The dry break couplers are of different dimensions in order to prevent incorrect connection of the hoses.

The outlet cap 1 is adapted to be used particularly for supplying chemical concentrate from the container 3 to a chemical concentrate metering device as disclosed in International Patent Publication No. WO 89/11219 for introducing a measured quantity of chemical concentrate into an agricultural sprayer system where it is diluted with water to form a spraying solution. In use in such an application, and after fitting of the supply cap 1 to the container outlet 2 in the manner already described, the hoses 15 and 19A are connected to the outlet duct 13 and the inlet duct 14 respectively and the container 3 is inverted, preferably being held in this position on a stand. The metering device is then operated to draw chemical concentrate from inside the container 3 along the hose 15, whilst a 3-way valve to which the hose 19A is connected is placed in a position to permit introduction of ambient or varying pressure air along the hose 19A, along the inlet duct 14 and through the nozzles 26, 27 and 28 into the container 3. The hose 19A is preferably arranged so as to prevent siphoning of concentrate along the hose 19A by way of the inlet duct 14. When the container 3 has been emptied the 3-way valve is moved to a position to permit admission of rinsing liquid or cleaning fluid along the hose 19A and through the inlet duct 14 and the nozzles 26, 27 and 28 into the container, the rinsing liquid subsequently being removed from the container 3 through the outlet duct 13 and the hose 15 if required.

If appropriate for a particular application, the inlet duct may include a non-return valve 40, as shown diagrammatically in broken lines in FIG. 1, to permit passage of air and rinsing fluid into the container, but to prevent concentrate from passing through the inlet duct 14 to the hose 19A. Furthermore the outlet duct 13 may be provided with a non-return valve 41, as shown diagrammatically in broken lines in FIG. 1, in order to permit passage of concentrate out of the container, but to prevent concentrate from passing along the outlet duct 13 in the opposite direction.

FIGS. 5 and 6 show two further forms of supply cap 50 and 60 which are not provided with a perforating cutting flange for providing access to the inside of the container 3, but which are instead intended to be ready fitted to the container (or possibly fitted to the container after opening of the container). In FIGS. 5 and 6 the same parts are given the same reference numerals as in FIGS. 1 to 4.

Referring to FIG. 5, the supply cap 50 has dry break coupling parts 17 and 19 similar to those shown in FIG. 1, except that in this case the parts 17 and 19 are integral with the outlet duct 13 and inlet duct 14 respectively which are in turn integral with the cap body 8. The cap body 8 has a peripheral shoulder 9A which rests on the rim 4 of the container outlet 2 and is sealed thereto by sonic welding or by an adhesive. In a variant of the illustrated arrangement the cap body 8 may be an interference fit on the outlet 2 or may even be integrally molded thereon. Alternatively the shoulder 9A may be secured to the rim 4 by being clamped thereon by an internally screw-threaded ring 7 (shown partially cut-away in FIG. 5) which is held on the externally screw-threaded rim 4 with an adhesive interposed therebetween so that it may be removed only with difficulty. The outlet duct 13 is optionally formed with a dip tube 51, and the inlet duct 14 is optionally provided with a non-return valve 52 within a dip tube 53. Where such a non-return valve 52 is provided, the dry break coupling part 19 may be dispensed with if required.

The supply cap 60 of FIG. 6 is very similar to the supply cap 50 of FIG. 5 except that it has a modified cap body 61 which is so formed as to cause the dry break coupling parts 17 and 19 to be recessed within the outlet rim 4. This permits an internally screw-threaded closure cap 62 (shown partly cut-away in FIG. 6) to be fitted to the outlet rim 4 when the container is supplied for use and to be subsequently removed by unscrewing to enable access to be obtained to the coupling parts 17 and 19 of the supply cap 60.

The above described supply caps may be adapted to supply liquid, granular or powder substances. Whilst the cap is designed primarily to protect the operator and the environment from spillage, vapor or dust contamination during the supply of such substances, it can equally as well be used in applications in which a substance to be supplied, such as a food substance, must be protected from contamination by the environment.

I claim:

1. A closed transfer device for agricultural chemicals comprising a container having an outlet for containing a quantity of fluid, and a supply cap connected to the outlet so as to permit supply of fluid under the action of gravity from within the container to a supply conduit in a sealed manner when the container is inverted so that the outlet is at its bottom, the supply cap including a connector body which is sealingly engaged with the outlet, an outlet duct extending through the connector body so as to be in fluid communication with the fluid within the container and provided for the passage of fluid out of the container when the container is inverted, an inlet duct extending through the connector body so as to be in fluid communication with the fluid within the container and provided for the passage of air into the container to displace fluid supplied by way of the outlet duct, nozzle means communicating with the same said inlet duct for distributing rinsing liquid supplied by way of the inlet duct within the container in the form of a spray, both said air and said rinsing liquid passing through the same said inlet duct, and coupling means mounted on the connector body for sealingly coupling the outlet duct to the supply duct such that, when the supply duct is connected to the coupling means, supply of fluid from the outlet duct to the supply conduit under the action of gravity is permitted when the container is inverted, whereas, when the supply conduit is disconnected from the coupling means, the outlet duct is closed off.

2. A device according to claim 1, and one-way valve means in said inlet duct permitting flow of air into the container but preventing flow of fluid from the container through said inlet duct.

3. A closed transfer device for agricultural chemicals comprising a container having a screw-threaded outlet for containing a quantity of fluid, and a supply cap connected to the outlet so as to permit the supply of fluid under the action of gravity from within the container to a supply conduit in a sealed manner when the container is inverted so that the outlet is at its bottom, a supply cap including a connector body having a screw-threaded portion which is sealingly engaged with the screw-threaded outlet, an outlet duct extending through the connector body so as to be in fluid communication with the fluid within the container and provided for the passage of fluid out of the container when the container is inverted, an inlet duct extending through the connector body so as to be in fluid communication with the fluid within the container and provided for the passage of air into the container to displace fluid supplied by way of the outlet duct, and coupling means for sealingly coupling the outlet duct to the supply conduit such that, when the supply conduit is connected to said coupling means, supply of fluid from the outlet duct to the supply conduit under the action of gravity is permitted when the container is inverted, whereas, when the supply conduit is disconnected from the coupling means, the outlet duct is closed off, said coupling means comprising a valve member on the connector body that has surface-to-surface mating engagement with a valve member on said supply conduit, whereby when the supply conduit and coupling means are disconnected, substantially no said fluid is exposed to the ambient atmosphere, and one-way valve means in said inlet duct permitting flow of air into the container but preventing flow of fluid from the container through said inlet duct.

4. A closed transfer device for agricultural chemicals comprising a container having an outlet for containing a quantity of fluid, and a supply cap connected to the outlet so as to permit supply of fluid under the action of gravity from within the container to a supply conduit in a sealed manner when the container is inverted so the outlet is at its bottom, a supply cap including a connector body which is sealingly engaged with the outlet and which is provided with closure piercing means for providing access through a closure member closing off the outlet when the connector body is engaged with the outlet on connection of the supply cap to the container, an outlet duct extending through the connector body so as to be in fluid communication with the fluid within the container and provided for the passage of fluid out of the container when the container is inverted, an inlet duct extending through the connector body so as to be in fluid communication with the fluid within the container and provided for the passage of air into the container to displace fluid supplied by way of the outlet duct, and coupling means mounted on the connector body for sealingly coupling the outlet duct to the supply conduit such that, when the supply conduit is connected to the coupling means, supply of fluid from the outlet duct to the supply conduit under the action of gravity is permitted when the container is inverted, whereas, when the supply conduit is disconnected from the coupling means, the outlet duct is closed off, and one-way valve means in said inlet duct permitting flow of air into the container but preventing flow of fluid from the container through said inlet duct.

* * * * *